United States Patent
Akopyan

(10) Patent No.: US 7,223,087 B2
(45) Date of Patent: May 29, 2007

(54) MICROWAVE MOLDING OF POLYMERS

(76) Inventor: Razmik Akopyan, 15421 W. 128th St., Olathe, KS (US) 66062

( * ) Notice: Subject to any disclaimer, the term of this patent is extended or adjusted under 35 U.S.C. 154(b) by 347 days.

(21) Appl. No.: 10/868,574

(22) Filed: Jun. 15, 2004

(65) Prior Publication Data

US 2004/0222554 A1    Nov. 11, 2004

Related U.S. Application Data

(63) Continuation-in-part of application No. 10/157,324, filed on May 29, 2002, now Pat. No. 6,984,352, and a continuation-in-part of application No. 10/435,315, filed on May 9, 2003.

(51) Int. Cl.
*B29C 35/08* (2006.01)
(52) U.S. Cl. .................. 425/174; 249/114.1; 425/174.4
(58) Field of Classification Search ............... 425/174, 425/174.4, 174.8 R, 174.8 E; 249/114.1; 264/219, 220, 224, 225, 226, 227, 432, 489
See application file for complete search history.

(56) References Cited

U.S. PATENT DOCUMENTS

| | | | |
|---|---|---|---|
| 2,407,833 A | 9/1946 | Jablonsky et al. |
| 2,421,096 A | 5/1947 | Vogt |
| 2,421,097 A | 5/1947 | Lasko |
| 2,438,952 A | 4/1948 | Te Grotenhuis |
| 2,595,502 A | 5/1952 | Aicher et al. |
| 2,626,428 A | 1/1953 | Bosomworth |
| 2,754,546 A | 7/1956 | Mason et al. |
| 3,294,879 A | 12/1966 | Jacobs |
| 3,475,522 A | 10/1969 | Garibian et al. |
| 3,519,517 A | 7/1970 | Dench |
| 3,777,099 A | 12/1973 | Levinson |
| 3,851,131 A | 11/1974 | Johnston et al. |
| 4,110,139 A | 8/1978 | Mashida |
| 4,268,238 A | 5/1981 | Marc |
| 4,269,581 A | 5/1981 | Ury et al. |
| 4,307,277 A | 12/1981 | Maeda et al. |
| 4,323,745 A | 4/1982 | Berggren |
| 4,441,876 A | 4/1984 | Marc |
| 4,454,403 A | 6/1984 | Teich et al. |
| 4,456,806 A | 6/1984 | Arimatsu |
| 4,466,938 A | 8/1984 | Gigl et al. |
| 4,477,707 A | 10/1984 | Kim |

(Continued)

*Primary Examiner*—Robert Davis
*Assistant Examiner*—Emmanuel S. Luk
(74) *Attorney, Agent, or Firm*—Erickson & Kleypas, LLC

(57) ABSTRACT

A mold for relatively uniform heating and molding of a work material to form a workpiece using a microwave oven, includes upper and lower mold members and a sidewall mold member. The mold members are formed from materials selected to have an approximately equal effective thermosensitivity. The effective thermosensitivity of work material is its dissipation factor divided by the product of its dielectric constant, density and specific heat. The effective thermosensitivity of the material of mold layer of each mold member is its dissipation factor divided by the product of its dielectric constant, density, and specific heat and multiplied by the fraction of the mass of its mold layer divided by the total mass of this mold member. A metal sleeve is formed on an inner surface of the sidewall mold member with microwave absorbing material formed on the outside thereof and inner surfaces of the end mold members may also be coated with metal or other highly thermally conductive and wear resistant material.

2 Claims, 6 Drawing Sheets

U.S. PATENT DOCUMENTS

| | | | |
|---|---|---|---|
| 4,481,159 A | 11/1984 | Itoh | |
| 4,524,037 A | 6/1985 | Marc | |
| 4,558,198 A | 12/1985 | Levendusky et al. | |
| 4,617,439 A | 10/1986 | Lespinats et al. | |
| 4,810,846 A * | 3/1989 | Holcombe et al. | 219/762 |
| 4,851,167 A | 7/1989 | Marc | |
| 4,880,578 A | 11/1989 | Holcombe et al. | |
| 4,921,646 A * | 5/1990 | Stewart | 264/475 |
| 4,939,330 A | 7/1990 | Berggren et al. | |
| 4,963,709 A | 10/1990 | Kimrey, Jr. | |
| 5,082,436 A | 1/1992 | Choi et al. | |
| 5,139,407 A | 8/1992 | Kim et al. | |
| 5,166,484 A | 11/1992 | Young et al. | |
| 5,202,541 A * | 4/1993 | Patterson et al. | 219/745 |
| 5,258,596 A | 11/1993 | Fabish et al. | |
| 5,290,490 A | 3/1994 | Nied et al. | |
| 5,321,222 A | 6/1994 | Bible et al. | |
| 5,406,058 A | 4/1995 | Lipp | |
| 5,420,404 A | 5/1995 | Goodman et al. | |
| 5,466,144 A | 11/1995 | Adams et al. | |
| 5,521,360 A | 5/1996 | Johnson et al. | |
| 5,593,610 A | 1/1997 | Minerich et al. | |
| 5,607,612 A | 3/1997 | Held et al. | |
| 5,639,518 A | 6/1997 | Ando et al. | |
| 5,659,972 A | 8/1997 | Min et al. | |
| 5,804,801 A | 9/1998 | Lauf et al. | |
| 5,811,769 A | 9/1998 | Schiffmann et al. | |
| 5,813,134 A | 9/1998 | Min et al. | |
| 5,844,217 A | 12/1998 | Hawley et al. | |
| 5,961,871 A | 10/1999 | Bible et al. | |
| 6,034,363 A | 3/2000 | Barmatz et al. | |
| 6,241,929 B1 | 6/2001 | Akopyan | |
| 6,365,885 B1 | 4/2002 | Roy et al. | |
| 6,486,455 B1 | 11/2002 | Merabet | |
| 6,512,216 B2 | 1/2003 | Gedevanishvili et al. | |

* cited by examiner

MICROWAVE MOLDING OF POLYMERS

CROSS-REFERENCE TO RELATED APPLICATIONS

This U.S. patent application is a continuation in part of and claims the benefit under 35 U.S.C. 120 of the filing date of U.S. patent application Ser. No. 10/157,324 filed May 29, 2002, now U.S. Pat. No. 6,984,352, and U.S. patent application Ser. No. 10/435,315 filed May 9, 2003.

BACKGROUND OF THE INVENTION

This invention relates generally to compression molding of polymers and composites by use of microwave energy, and more specifically to the design of molds for processing of such materials including the selection and/or modification of mold materials to form the mold to provide for uniform heating of polymers and composites by microwave energy. The molds and processes disclosed herein are adapted for molding parts of uniform thickness, variable thickness or complex shape. The developed technique may be used for molding of wide variety of polymers and composites from zero loss factor to conductive grades not withstanding the dielectric or thermal properties of the polymers.

Modern high performance engineering polymers known under trademark names PEEK®, TORLON®, SEMITRON®, DURATRON®, CELAZOLE®, and others perform at extremely high temperatures, well above 500° F., with superior mechanical and chemical properties. Compression molding of such polymers to stock and custom shapes by microwave energy offers a promising alternative to conventional compression molding techniques generally utilizing electric, gas or steam heating to heat the polymer or work material. For this reason, designing a mold, capable of processing a variety of such polymers by microwave energy, is of great practical importance.

As used herein, the polymer, composite, or ceramic materials to be processed in the mold cavity may be referred to as the work material or material to be molded and the part or component to be formed thereby may be referred to as the workpiece or molded part. The work material may be supplied in pellet, powder, liquid or solid form. Although injection molding is widespread, processes for preheating polymer powders and pellets or granules are still necessary because for certain end products, compression molding is preferred. For injection molded parts the thickness of the part to be molded is limited by the relationship of the flow length versus thickness of the workpiece. For this reason relatively thick parts of some polymers must be compression-molded.

The process of heating polymer powders with conventional techniques is very slow due to poor thermal conductivity of the polymer. When using only thermal conductivity to heat the work material, heat flows from the polymer surface toward interior regions, which therefore necessitates an extended period of heating time to equalize the temperatures through the entire volume of the work material without overheating of its surface. The heating time of conventional heating means may exceed several hours depending on the thickness of the part to be molded. Increased heating time may require the use of grain growth inhibitors, which usually reduces mechanical strength of the polymer. It also boosts energy consumption and the per unit parts cost.

In conventional compression molding processes of polymers, high temperatures, long processing times, and, in some cases, hot pressing must be applied in the fabrication of products to achieve the highest density and minimum porosity. Conventional compression molding of polymers involves the compaction of a polymer powder into the desired shape following by sintering. The powder is placed in a mold and compacted by applying pressure to the mold halves. The compacted powder is usually porous and its porosity depends upon the amount of applied pressure and the resistance of the particles to deformation. The compacted powder is then heated in the conventional oven to promote bonding of the powder particles. The sintering temperature causes diffusion and neck formation between the powder particles resulting in a dense body.

The uniform heating and molding of polymers in microwave ovens has unique advantages over conventional compression molding. The use of microwave energy reduces processing time by a factor of 10 or more. The shortened process time minimizes grain growth. A fine initial microstructure retains the same grain size without using grain growth inhibitors and allows achievement of a high mechanical strength. It is believed that the disclosed microwave process will produce products having improved mechanical properties with additional benefits of short processing time and significantly reduced energy usage along with clean environment.

Compression molding of high performance engineering polymers often requires compression at temperatures above 700° F. and pressures around 2000 psi for prolonged periods of time to provide high quality consolidation of the powdered or granular work material. For example, Polybenzimidazole, known under trade-mark name CELAZOLE®, has one of the highest heat deflection temperatures of 800° F. at 264 psi and must be processed at temperatures well above 800° F. and at high pressures. The ceramic molds developed and disclosed in my above mentioned U.S. patent applications may be susceptible to chipping and wearing after long runs in such extreme environments. The employed metal reinforcing rings extending around the side mold wall, significantly strengthen the ceramic mold in the radial direction but cannot provide the same strength in the longitudinal direction, which may shorten the life of mold. By increasing the number of reinforcing rings, the desired mold strength may be achieved in the radial direction but not in the longitudinal direction.

Although it might seem logical to replace the reinforcement rings by one solid metal tube extending around the ceramic sidewall of the mold to increase the strength of the mold in both radial and longitudinal directions, such a design has drawbacks. The primary drawback being that the metal tube surrounding the ceramic sidewall will act as a shield preventing uniform heating of the sidewall of the mold. This will result in significant non-uniform heating of the work material, making it impossible to achieve uniform compaction of polymer powder or granules. Another drawback is chipping and wearing of inner ceramic surface after long run of the mold.

The known prior art does disclose the use of molds adapted for microwave heating that are made partially or completely of metal or other electrically conductive materials. For example, in U.S. Pat. No. 5,202,541, a plurality of ceramic articles or work pieces to be sintered, are buried within a powder bed made of either microwave transparent material or high loss material. This work piece assembly is surrounded by a crucible which may be made either from microwave transparent material or microwave suspector material for additional heating of work assembly by conduction heating. Such a crucible contains thin metal rings for fixing the field around work piece assembly, but which are not designed for reinforcement of assembly. U.S. Pat. No. 5,202,541 teaches against positioning the rings too close together because doing so will result in non-uniform heating as discussed above. The preferred spacing between rings is identified as 10–20 mm at a frequency of 2.45 GHz.

U.S. Pat. No. 4,617,439 discloses a process for vulcanizing and polymerizing a work material in the form of relatively thin sheets placed between metal plates. The sandwich structure is then pressed and placed in the resonance cavity of a microwave oven for heating by microwave energy. Metal plates are used for compression and shaping of work material and also to provide uniform heating. The drawback of this apparatus is that it cannot be used for processing relatively thick parts from powders or liquids since there is no sidewall.

U.S. Pat. No. 4,323,745 discloses a mold for uniform heating of a work material having a relatively high loss factor. The mold is made of thick ceramic material transparent to microwave energy and has a cavity for placement of the work material. The ceramic enclosure is contiguously enclosed by a metal enclosure having enough mechanical strength to withstand process pressures. Microwave energy is introduced into the inner cavity of the metal enclosure via waveguides or coaxial lines from two generators operating at slightly different frequencies. The metal enclosure serves as both the mold and the microwave resonance cavity.

A similar mold concept can be found in U.S. Pat. No. 5,844,217, which discloses an apparatus for molding liquid thermoset resins by microwave energy. The method uses a metal mold having inner cavity where the work material may be placed and processed. Microwave energy is introduced into a part-shaped mold cavity via multiple ports.

Another mold design utilizing a similar concept may be found in U.S. Pat. No. 4,269,581, where thermoset resin is cured in the space formed by coaxial metal conductors of a coaxial transmission line. The main disadvantage of the apparatus disclosed in the above noted U.S. Pat. Nos. 4,323,745, 5,844,217, and 4,269,581 is that the resonance cavities are part-shaped and require modification with changes in the shape and dimension of the work piece to be molded. This is very costly and time consuming.

A more economical approach is the concept of a batch microwave system having a metal chamber as applicator and means for introducing of microwave energy into this chamber. Different molds of different dimensions and shapes can be placed inside this chamber for processing of work pieces of variable shapes. In contrast with dual function of mold cavity (mold cavity+resonance cavity), the separation of the mold from the resonance cavity allows the system to be more flexible and efficient.

It is known in the food industry and for sterilization purposes to use a metal container covered with a layer of microwave absorbing material to heat different objects positioned in the container. U.S. Pat. No. 5,258,596 discloses a thin walled container formed from a microwavable foil having a layer of organic material containing microwave absorbing dielectric and magnetic components located on the outside surface of a thin metal layer. Such a container formed from a thin metal layer with a thin microwave absorbing coating and with an item to be heated positioned inside may be placed into the chamber of a microwave oven to heat the item. In this case, the heat is developed initially in the coating due to its exposure to the microwave field. Then, the heat is transferred through the metal layer and finally to the item to be heated by thermal conduction and radiation. In a disclosed embodiment the microwave absorbing layer has a thickness of approximately 3 mil (3 thousandths of an inch) and the metal containing layer has a thickness of approximately 21 mil. However due to the thin walled nature of such containers, they are not appropriate for use in forming a compression mold. In addition, such a thin walled container cannot provide effective heating for a relatively large mold or item to be molded.

There remains a need in mold design for microwave molding of polymers, which can withstand high pressures and high temperatures and provide uniform heating by using batch microwave system.

SUMMARY OF THE INVENTION

The present invention comprises a compression mold for use in heating and shaping a polymer work material in a microwave oven. The mold includes a sidewall mold member and a pair of end mold members at least one of which is compressible toward the other to compress a quantity of work material positioned within a mold cavity formed between the mold members. The sidewall mold member comprises a sleeve formed from hard and wear resistant material, capable to withstand high tensile stresses on the order of 50,000 psi and high temperatures around 900° F. Another requirement is that the material of the sleeve has a relatively smooth surface finish. Metals or alloys are suitable materials for the sleeve, which extends around the mold cavity. The sleeve may be of a wide variety of geometries including round, square, rectangular or oval. The metal sleeve preferably defines the inner surface of the mold cavity in which the material to be molded or work material is placed. A layer of microwave absorbing material that will be efficiently heated by microwave energy is formed on the outer surface of the metal sleeve. In this mold design, the electric field will be almost zero on the inner surface of the metal sleeve which defines the peripheral region of the work material. This peripheral region of the work material is not heated directly by microwave energy. Rather the peripheral region of the work material is heated by thermal conduction and radiation through the metal layer from the outer microwave absorbing layer. Such a mold design does not provide uniform heating of the work material by direct absorption of microwave energy, rather it seeks to obtain approximate uniform heating through hybrid heating. The inability to obtain true uniform heating of the work material by direct absorption of microwave energy is well compensated for by the numerous benefits obtained by hydrid heating with metal mold components, including easy of fabrication of the mold parts for even complicated part shapes, the ability to polish the inner mold surfaces thereby maintaining the mold quality, and significantly increased lifetime and reduced costs to manufacture the mold. The employed hybrid heating provides high quality molding and significantly reduces heating time in comparison with conventional compression molding processes.

In one embodiment of the present invention, which is suitable for processing a wide variety of work materials, each end mold member is formed from a microwave absorbing material. These materials partially absorb incident microwaves and allow microwaves to penetrate into the work material and heat it. When moving from the sidewall toward the central region of the mold cavity, the electric field generated by the microwave energy increases, resulting in an increase of the volumetric heating from the periphery toward the center of the work material or workpiece. The work material is thereby heated by hybrid heating in which different regions of the work material or zones of the mold cavity are heated by different mechanisms: the central regions are heated mostly by direct absorption of microwave energy and the peripheral regions are heated by thermal conduction and radiation from the outer microwave absorbing material, which in turn, is heated by exposure to the microwave field.

In this embodiment, the smallest temperature gradients across the mold structure and, hence, the shortest processing times may be achieved by maintaining approximately equal heating rates of all the mold members and the central region of work material. This may be accomplished by equalizing the effective thermosensitivities of the work material and the material forming each mold member. If the effective thermosensitivity of the work material does not match that of the mold members, it will result in increased thermal gradients and, hence, will require longer processing times.

In another embodiment, also suitable for processing a wide variety of work materials, a layer of metal of relatively complex shape is formed on the inner surface of the end mold members. These metal layers define the outer periphery of the mold cavity. The layer of microwave absorbing material of each end mold member is formed on an outer surface of the metal layer. In this embodiment the work material may be fully or partially shielded from the microwave field. Heat develops in the outer, microwave-absorbing layer, due to exposure to the microwave field, and is transmitted through the metal layer to the work material by thermal conduction and radiation only.

The apparatus for compressing the end mold members toward each other is made of microwave transparent materials. The metal sleeve and metal layers on the end mold members are less susceptible to wear than the microwave absorbing material which is typically a ceramic material which is prone to chipping, cracking and wearing. Use of the metal sleeve and metal layers on the end mold members increases the life of the mold due to the high tensile strength of metal and its capability to provide good surface finish of the mold cavity.

In another embodiment of the present invention thermally conductive spacers or separators are positioned between alternating layers of work material in the mold cavity to form a multi-layer structure. The separators are preferably formed of metal, alloys, ceramic or other materials having relatively high thermal conductivity to promote heat transfer from hot peripheral regions of the mold members or work material into its central region and, thus, to provide relatively uniform and fast heating of this multi-layer structure. In another embodiment the separators are made from microwave absorbing ceramic such as silicone carbide.

The materials used to form the microwave absorbing layers of the mold members are created by adding selected materials or additives to a base mold material to provide approximate equality of the "effective" thermosensitivities of the material forming each mold member.

DETAILED DESCRIPTION OF THE INVENTION

Figure 1:
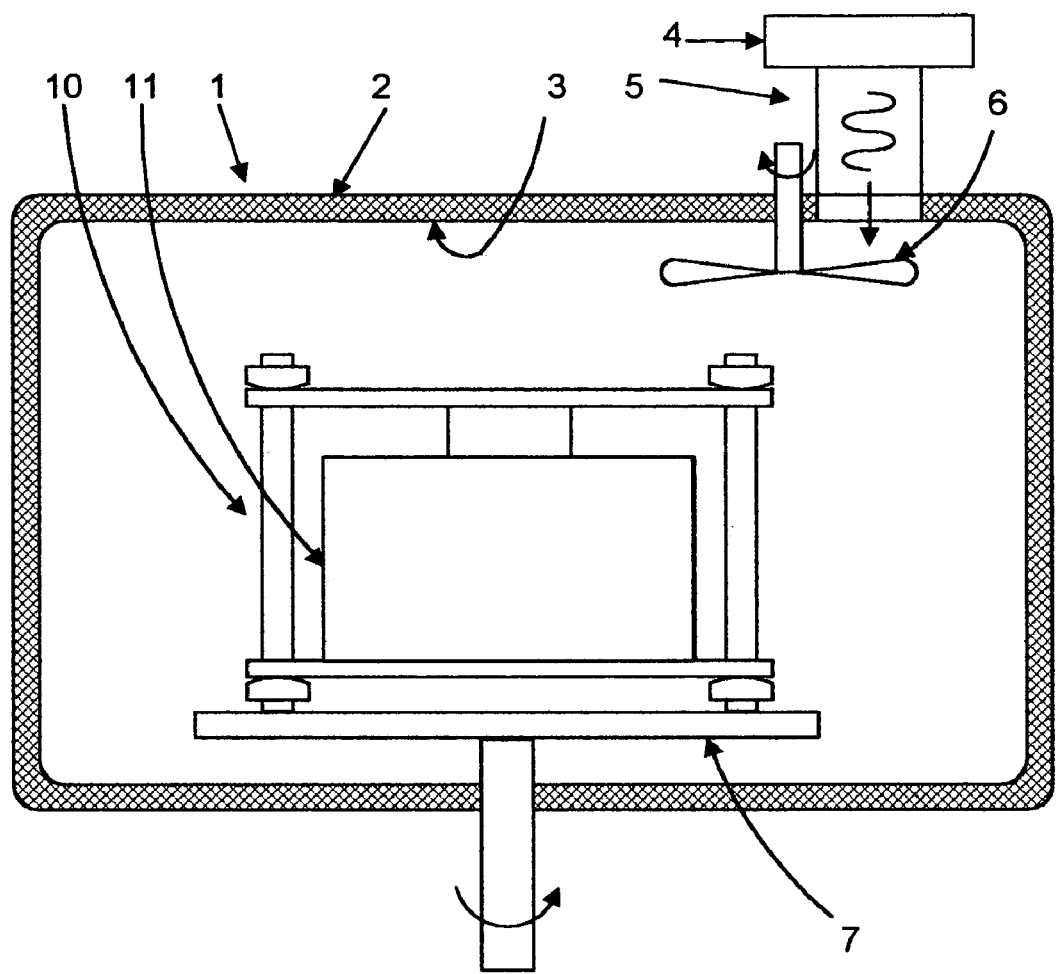
FIG. 1 is a schematic view of a batch microwave system with mold assembly as a load, adapted to heat the mold by microwave field developed in the microwave cavity.

The present invention comprises a mold for use in heating and compressing a work material using microwave energy. The mold includes having a relatively rigid metal sleeve forming an inner surface of a sidewall mold member and defining the outer periphery of a mold chamber. A layer of microwave absorbing material is formed on an outer surface of the metal sleeve. End mold members are compressible toward each other to compress the work material positioned therebetween in a mold cavity. The end mold members are formed from at least a layer of microwave absorbing material. In one embodiment, a layer of metal is formed on inner surfaces of the end mold members adjacent the mold cavity to surround the contents of the mold cavity. A microwave transparent compression device for compaction of polymer powder in a microwave oven is part of the mold assembly and provides the necessary compaction of the powdered work material during the heating cycle.

Conventional molding processes require employment of hydraulic presses, which generally are not compatible with a microwave oven cavity. Therefore, the primary compaction of polymer powder or pellets in the mold is performed in a regular hydraulic press before placing it into the microwave oven. After the polymer powder or pellets are compacted to a uniform and maximal achievable density, the mold halves are then compressed by a compression device, i.e., springs or plates of the mold assembly, and the whole mold assembly is then placed into the microwave oven. The compacted powder or work material is then heated in the mold by microwave energy. Upon reaching the sintering temperature, the whole mold assembly is then removed from the microwave oven and placed into a regular press for final compression to obtain the desired shape of the work piece.

As disclosed in my previous U.S. patent application Ser. No. 10/157,324, the uniform heating of the work material is provided by equalizing the relative thermosensitivities of the work material and that of the material of the inner mold layer adjacent to the work piece. This condition provides approximately the same heating rate of the work material and the mold itself. In this mold design the mass of the outer mold layer is assumed to be much smaller than the mass of the inner mold layer and is not counted in the heat capacitance of the mold. However, further improvement of the mold required a stronger mold body including a much heavier outer mold layer and reinforcement rings for the mold. The formulation of the mold material for each mold member then had to be selected individually depending on the mass of the outer mold layer along with the mass of other components of the mold members, such as reinforcement rings, thermal insulation and the like.

As described in my Patent Application Publication No. 2003/0224082 A1, uniform heating of the work material was obtained by equalizing the effective thermosensitivites of the work material and the materials forming each mold member. In both my prior patent applications discussed herein, the mold was designed for a specific type of work material or work materials having a relatively narrow range of thermosensitivity, approximately equal to that of the mold members. This narrows the range of work materials with which the mold can be used.

The mold of the present invention is capable of processing a wide variety of materials from microwave transparent materials to highly conductive grades of polymers and composites and of uniform or variable thickness. The mold includes at least three mold members, top and bottom or first and second end mold members or plungers and a circumferential sidewall. The sidewall includes a metal sleeve or layer covered on its outer surface by relatively thick layer of microwave absorbing ceramic material. The thickness of the metal sleeve and the specific metal utilized is selected to withstand tensile forces in the sidewall during compression. For example, the metal sleeve may be formed from 420-grade stainless steel, which is readily machined on a CNC machine and welded to form the metal body of the sidewall. The metal body of the sidewall may be further heat treated to obtain a desired hardness and may be polished. The end mold members are similarly formed from microwave absorbing ceramic material but in this embodiment do not include a metal layer.

The inner surface of the metal sleeve and the inner surface of the end mold members define a cavity of the mold into which the work material is positioned. In contrast to the multilayer ceramic mold structure, disclosed in my previous applications, the present invention utilizes single ceramic layers for each mold member. The microwave absorbing ceramic materials of each of the mold members are formed with additives that are selected to approximately equalize the heating rates of the mold members. In this embodiment, uniform heating of the work material is provided by hybrid heating wherein the central region of the work material is heated directly by exposure to a microwave field and peripheral regions adjacent to sidewall are heated due to thermal conduction and radiation from the microwave absorbing ceramic layer through the metal sleeve upon heating of the microwave absorbing ceramic layer by exposure to the microwave field. In this embodiment, the smallest thermal gradients in the mold cavity and, hence, the shortest processing time may be achieved if the heating rate of the central region of the work material is approximately equal to that of the mold members.

The mold permits molding of relatively thick parts in relatively short process times due to the volumetric heating of the central volume of the workpiece or work material by microwave energy. The mold may also be used for molding polymers with no or low loss factors. However, longer process times will be required because of higher thermal gradients in the mold cavity. The mold assembly also includes means for applying compression forces to advance the top and bottom plungers toward each other to close the mold assembly. The mold assembly is preferably positioned in the cavity of a conventional multimode microwave oven. In this embodiment and the other embodiments described herein is foreseen that one of the end mold members may be fixedly secured to or integrally formed with the sidewall mold member with the other end mold member or plunger slidably positioned within the sidewall mold member and moveable toward the fixed end mold member. Ejector pins or the like, extending through the fixed end mold member would then be used to eject the workpiece from the mold after removing the moveable end mold member therefrom.

Another embodiment of the mold is also adapted for molding of a variety of polymers and composites into a workpiece of uniform or variable thickness regardless of the polymers dielectric and thermal properties. The mold utilized also includes at least three mold members; upper and lower or first and second end mold members or ceramic plungers and a circumferential sidewall mold member. The end mold members each include a metal layer on their inner surfaces adjacent to the mold chamber and work material positioned therein. The sidewall mold member includes a metal sleeve forming an inner surface thereof. The thickness of the metal sleeve is chosen to withstand tensile forces acting on the sidewall during compression. The metal layer of the end mold members and the metal sleeve of the sidewall mold member are covered on their outer surfaces by a relatively thick layer of microwave absorbing ceramic material. The metal enclosure formed by the metal sleeve and metal layers on the end mold members is contiguously enclosed by the microwave absorbing ceramic layers. Selective additives are incorporated into the ceramic material of the microwave absorbing ceramic layer to approximately equalize the heating rates of all of the mold members. The metal layers on the plungers protect them from chipping and wearing and provide longer mold life. Heating of the work material is provided due to thermal conduction and radiation through the metal layers and sleeve from the microwave absorbing ceramic layers, which, in turn, are heated by exposure to a microwave field. This mold design has longer life, but requires longer processing time for molding parts of the same thickness as in the previously discussed embodiment. The mold assembly also includes means for applying compression forces to advance the end mold members toward each other to close the mold assembly. The mold assembly is positioned in the cavity of a conventional multimode microwave oven.

FIG. 1 generally comprises a diagrammatic view of a batch microwave oven 1 for molding various polymer work materials into a workpiece of variable thickness and complex shape. Oven 1 includes a metal chamber 2 defining a microwave resonance cavity 3 into which microwave energy is directed from a generator 4, such as a magnetron, through a launch port of waveguide 5. The microwave oven 1 also includes mode stirrer 6 and turntable 7 for providing better conditions for uniform heating of the work material. The batch microwave oven 1 shown in FIG. 1 is representative of a multimode microwave oven having a single or plurality of generators 4 and waveguides 5 for generating and directing microwave energy into the microwave resonance cavity to heat the mold and work material.

Figure 2:
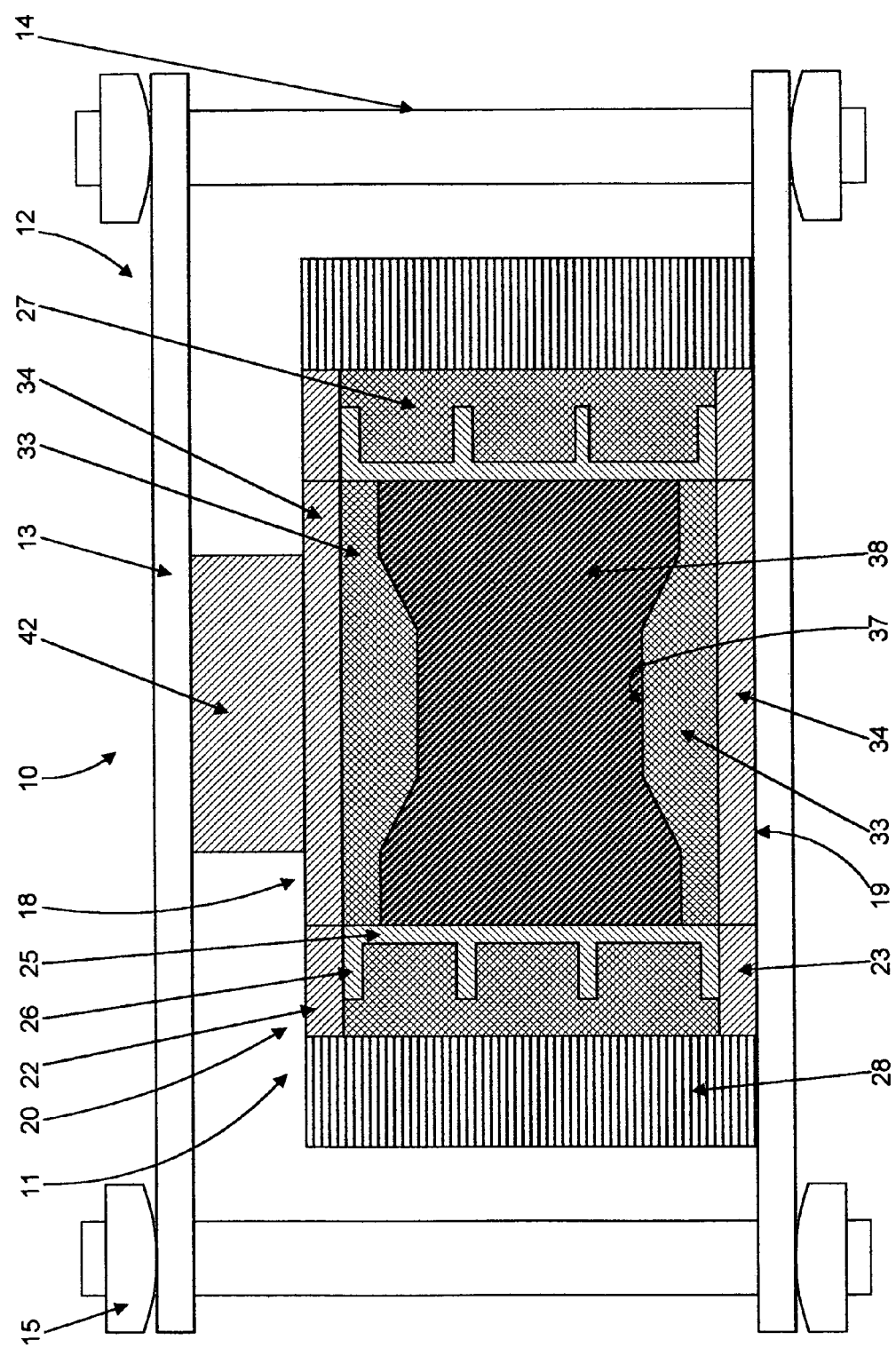
FIG. 2 is a cross-sectional view of a mold of the present invention including a sidewall with a cylindrical metal sleeve and upper and lower ceramic plungers, adapted to mold work material into a workpiece of complex shape in a conventional microwave oven.

A mold assembly 10 including mold 11 and a compression assembly 12, shown in more detail in FIG. 2, is positioned on the turntable 7. The turntable 7 is preferably made of a microwave transparent material such as polypropylene or Ultem®1000. The compression assembly 12 shown comprises two rigid plates 13 secured together by threaded studs 14 and nuts 15 for drawing or squeezing components of the mold 11 together, namely mold members 18 and 19. The components of the compression assembly are made of microwave transparent material with a high mechanical strength, such as Ultem®1000 or the like.

The mold 11 generally comprises a sidewall or sidewall mold member 20 and first and second end mold members or plungers 18 and 19. The sidewall mold member 20 comprises a metal sleeve 25 with reinforcement ribs 26 extending radially outward therefrom and a microwave absorbing layer 27 formed from a microwave absorbing ceramic material 27 which is formed on and surrounds the metal sleeve 25. The sleeve 25 may be round, rectangular or other circumferential shapes. A sidewall insulating layer 28 formed from insulating material extends adjacent to and around the microwave absorbing layer 27. Very light fiberglass or ceramic blankets with very low thermal conductivity around 0.2–0.4 BTU-in/HrFt$^{2\circ}$ F. may be used for the sidewall insulating layer 28. Sidewall mold member also contains top and bottom thermal insulators 22 and 23.

Each of the first and second end mold members 18 and 19 also comprise a microwave absorbing layers 33 and 34 preferably formed from a ceramic material and an insulating layer 35. Because the insulating layers 35, 22 and 23 are subject to compression upon compressing of mold halves 18 and 19, they are preferably formed from a relatively rigid insulating material such as glass-mica ceramic plates with high compressive strengths and low thermal conductivities. The insulating layers 28, 34, 22 and 23 reduce heat radiation from the hot mold during the heating cycle. Inner surfaces of the metal sleeve 25 and the end mold members 18 and 19 define the outer surfaces of a mold cavity 37 in which work material 38 is molded to form a workpiece 39 of complex shape shown in FIG. 3. The work material 38 positioned in the mold cavity 37 generally extends in intimate contact with the inner surfaces of metal sleeve 25 and end mold members 18 and 19.

Figure 3:
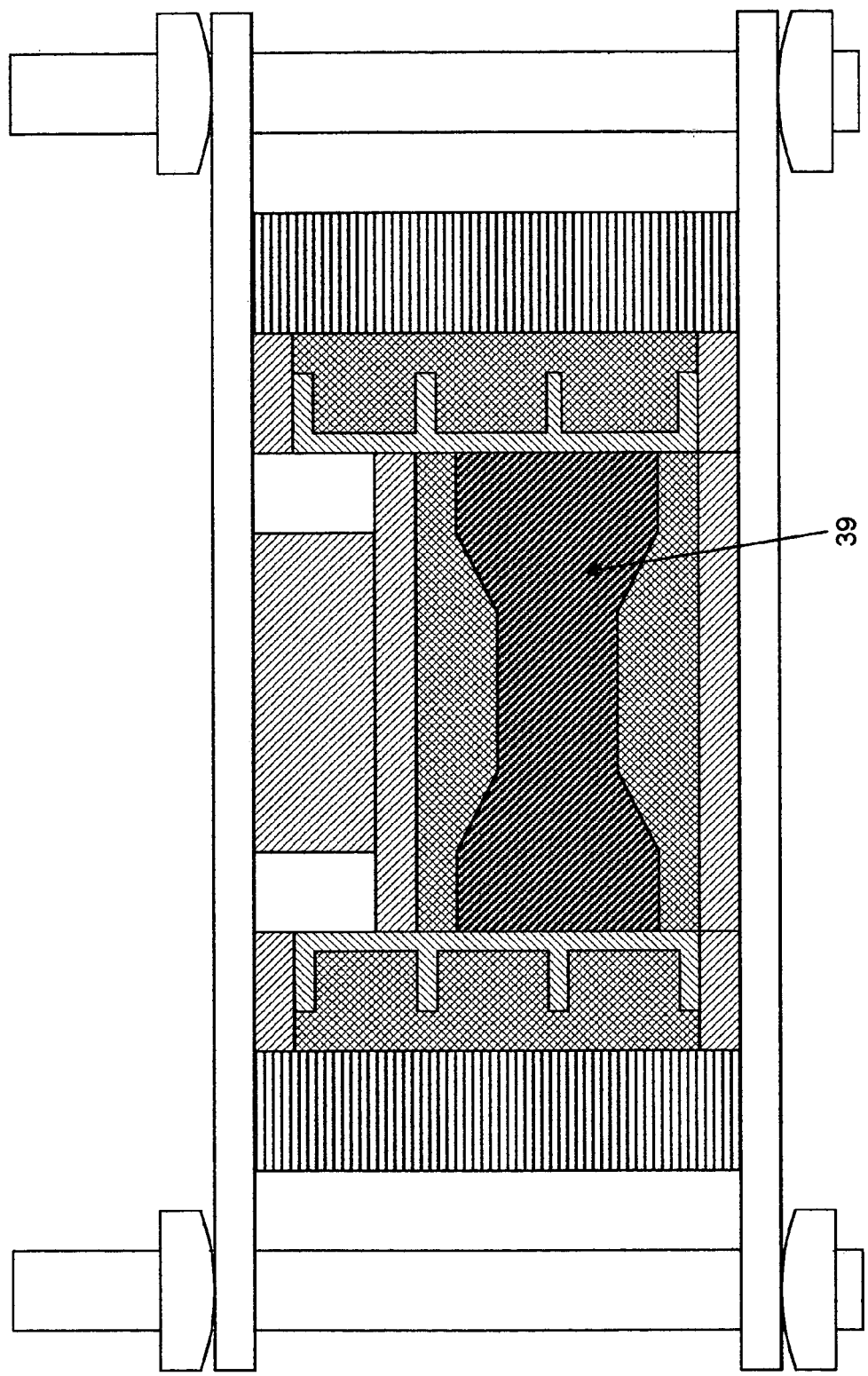
FIG. 3 is a cross-sectional view of the mold of the present invention showing the position of the upper and lower plungers after full compaction of the work material to a desired shape for the workpiece.

Referring to FIG. 2, a spacer or plunger block 42 is positioned between the first or upper end mold member 18 and compression plate 13. Referring to FIG. 3, when the compression plates 13 are drawn together, the upper plate 13 acts on the plunger block 42 which drives the upper end mold member 18 toward the lower end mold member 19 compressing work material 38 into its final shape and forming workpiece 39. The nuts 15 are tightened to hold the shape of molded part during cooling cycle.

A wide variety of means for compressing the mold 11 could be utilized including different types of springs or hydraulic devices. The work material to be molded into a workpiece 39 is positioned in the mold cavity 37 where it is heated by the microwave energy and compressed by the biasing force of plates 13 on the plunger block 42 and upper and lower end mold members 18 and 19 to compress the work material to form the workpiece into the desired shape as defined by the shape of the inner surface of the end mold members 18 and 19 and the sidewall mold member 20.

To understand the physical mechanism and necessary conditions for providing uniform heating of the work material 38, the conditions to which the mold 11 is subjected in the batch microwave oven 1 are analyzed. The field pattern of an electric field in an empty cavity 3 of a multimode microwave oven 1 is very complicated and may be characterized by the presence of a large number of resonant modes in a given frequency range. Upon introduction of the mold assembly 10 into the cavity 3, the conditions will be significantly changed. The microwave absorbing ceramic layer 27 of sidewall 20 and 33 and 34 of end mold members 18 may be made of silicone carbide (SiC). Silicone carbide readily absorbs microwave energy. The silicone carbide is preferably applied at a thickness of 2–3 inches, which is comparable to and in some places exceeds the penetration depth of microwaves at operating frequency of generator. A relatively thick layer of silicone carbide will efficiently absorb the incident waves and waves partially reflected from metal surfaces of the mold. A relatively large amount of silicone carbide on the outer mold surfaces, presents for the generator an efficient load with a relatively high dissipation factor (tan δ=0.05).

Under these conditions, there is little stored energy in the resonance cavity, which means that the Q-factor is very low and resonance is virtually suppressed. The Q-factor may be represented as follows:

$$Q = 2\pi \frac{\text{energy stored}}{\text{energy lost per cycle}} \quad (1)$$

For a load with a high dissipation factor and filling a significant portion of the volume of the resonance cavity, the Q-factor may be given by approximate formula:

$$Q \approx \frac{1}{\tan \delta_{\text{eff}}} \quad (2)$$

With tan $\delta_{\text{eff}}$=0.05 we can expect very low Q-factor:

$$Q \approx 20\text{–}200,$$

Such low value of Q-factor means that the cavity operates aperiodically. With such high losses, the impendence match of generator and the load improves, resulting in efficient power transfer from the generator to the load.

The presence of relatively thick microwave absorbing layers of silicone carbide around the mold will make the field in the vicinity of the mold more uniform. The relatively high thermal conductivity of SiC (270 W/K·m, which is comparable to the thermal conductivity of copper at 390 W/K·m) results in relatively quick equalization of the temperatures in the mold 11 and reduction of thermal gradients. Even though the distribution of the electric field around the mold 11 may not be uniform, the relatively efficient absorption of microwaves by silicone carbide and the relatively high thermal conductivity of silicone carbide and the mold's metal parts will average out such non-uniformities. With this in mind, the conditions for uniform heating of the work material can be formulated.

As described in my previous published patent application number US 2003/0224082A1, uniform heating and molding of the work material may be obtained under conditions wherein the heating rates of all the mold members and the work material are approximately equal, which may be formulated in terms of their thermosensitivities:

$$\left(\frac{\tan \delta}{\epsilon c\rho}\right)_{work} = \left[\left(\frac{\tan \delta}{\epsilon c\rho}\right) \times \frac{M_{ceramic}}{M_{total}}\right]_{top\ plunger} = \quad (3)$$

$$\left[\left(\frac{\tan \delta}{\epsilon c\rho}\right) \times \frac{M_{ceramic}}{M_{total}}\right]_{bottom\ plunger} = \left[\left(\frac{\tan \delta}{\epsilon c\rho}\right) \times \frac{M_{ceramic}}{M_{total}}\right]_{sidewall}$$

Where:
the subscripts "work", "top plunger", "bottom plunger" and "sidewall" refer to properties of the work material and ceramic, microwave absorbing material of these parts, respectively,
∈=dielectric constant,
tan δ=dissipation factor,
c=specific heat,
ρ=density.
$M_{ceramic}$=the mass of ceramic of respective mold member,
$M_{total}$=total mass of respective mold member.

In the present mold design, as mentioned above, it is required to provide equality of heating rates only for the mold members to maintain approximately equal surface temperatures of work material and allows the avoidance of their overheating or under cure. This condition may be formulated in terms of equalizing the effective thermosensitivities of each of the mold members and may be written in the form:

$$\left[\left(\frac{\tan \delta}{\in c\rho}\right) \times \frac{M_{ceramic}}{M_{total}}\right]_{top\ plunger} = \quad (4)$$

$$\left[\left(\frac{\tan \delta}{\in c\rho}\right) \times \frac{M_{ceramic}}{M_{total}}\right]_{bottom\ plunger} = \left[\left(\frac{\tan \delta}{\in c\rho}\right) \times \frac{M_{ceramic}}{M_{total}}\right]_{sidewall}$$

This condition provides equal temperature rise ratings of the sidewall mold member 20, and the top and bottom plungers or end mold members 18 and 19. In this mold design the work material may have any thermosensitivity, but the optimal case, with the shortest processing time, occurs when relative thermosensitivity of work material (tan δ/∈cρ)$_{work}$ matches to that of mold members given in formula (3). It is practical to choose the formulations of the microwave absorbing materials of the mold members to provide the desired heating rates around 60° F./min at a predetermined mold mass and microwave power level of the generator. Examples are provided hereafter.

Figure 4:
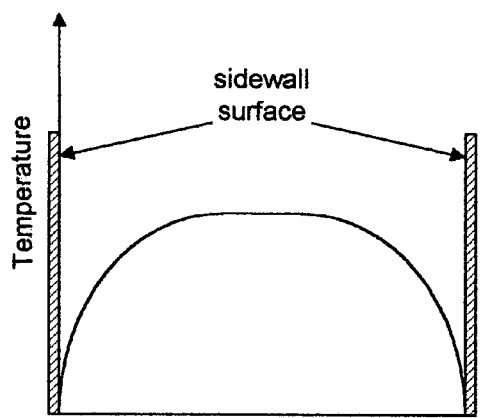
FIGS. 4A to 4D are graphs showing temperature distribution in the work material due to different mechanisms of heating; a) microwave losses only (FIG. 4A); b) thermal conduction and radiation from the hot mold members only (4B); c) hybrid heating due to microwave losses and conventional heat transfer by thermal conduction and radiation from the hot mold members (4C); d) temperature field inside workpiece after reaching thermal equilibrium inside the mold (FIG. 4D).
Figure 4:
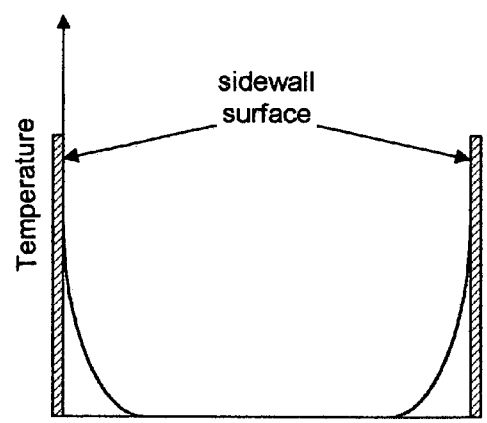
Figure 4:
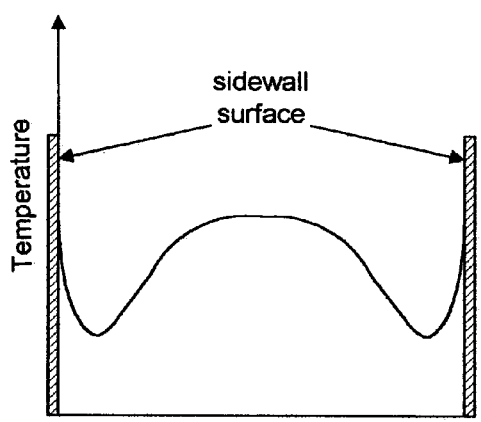
Figure 4:
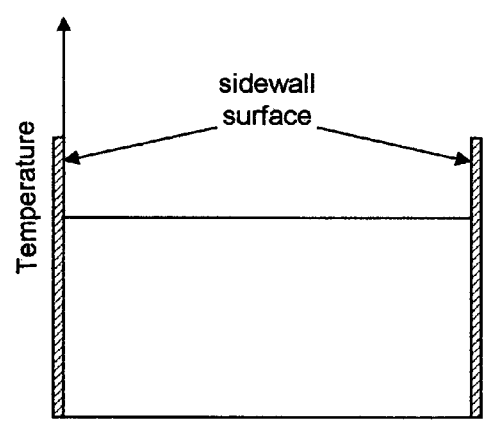

As mentioned above, this condition provides equal temperature rise ratings of the sidewall mold member 20, and the top and bottom plungers or end mold members 18 and 19. In addition, heat transfer due to thermal conduction and radiation from the sidewall mold member 20 will heat the peripheral regions of the work material 38 adjacent to the sidewall 20 making the temperature distribution inside the work material 38 more uniform. During the heating process in the microwave oven 1, the work material 38 in the central region of the mold cavity 37 is heated by direct exposure to the microwave field (through the end mold members which are not shielded). FIG. 4A diagrammatically illustrates the temperature pattern due to microwave losses in the work material 38 in the mold cavity 37 disregarding heat transfer from the mold sidewall 20.

FIG. 4B illustrates the temperature pattern inside the work material 38 due to heat transfer and radiation from the sidewall 20 disregarding microwave losses in the work material 38 in the central region of the mold cavity 37. Combining temperature patterns shown in FIG. 4A and FIG. 4B, FIG. 4C demonstrates real temperature pattern existing in the work material 38 by the end of heating cycle. As will be described in the following examples, the heating process is conducted with interruptions to allow reductions of temperature gradients in the mold structure. The lowest thermal gradients and, hence, the shortest processing time will be achieved when the dielectric property of the work material matches that of the mold members as indicated in formula (3). By the end of the heating cycle, the temperature of the work material 38 in the center of the mold cavity 37 will reach the process temperature, which is enough for full compaction of the powdered work material 38 and its consolidation. Because the mass of the mold 11 is significantly greater than the mass of the work material 38 in the mold cavity 37, the temperature will be equalized soon after the heating process is finished. The insulating layers 28,22 and 23 of the sidewall 20 and insulating layers 35 of end mold members 18 and 19 are relatively efficient and preferably provide a cooling rate not exceeding 0.3° F./min. With such small heat losses, the temperature field of the work material 38 in the mold cavity 37 reaches thermal equilibrium as shown in FIG. 4D. The time required for establishing thermal equilibrium depends on the thermal properties of the work material 38 although such time is relatively quick when compared with the required times to establish equilibrium in pre-existing systems. Also, equalization of the temperature field inside the mold occurs during the cooling time, when the mold is taken out of the microwave oven.

Figure 5:
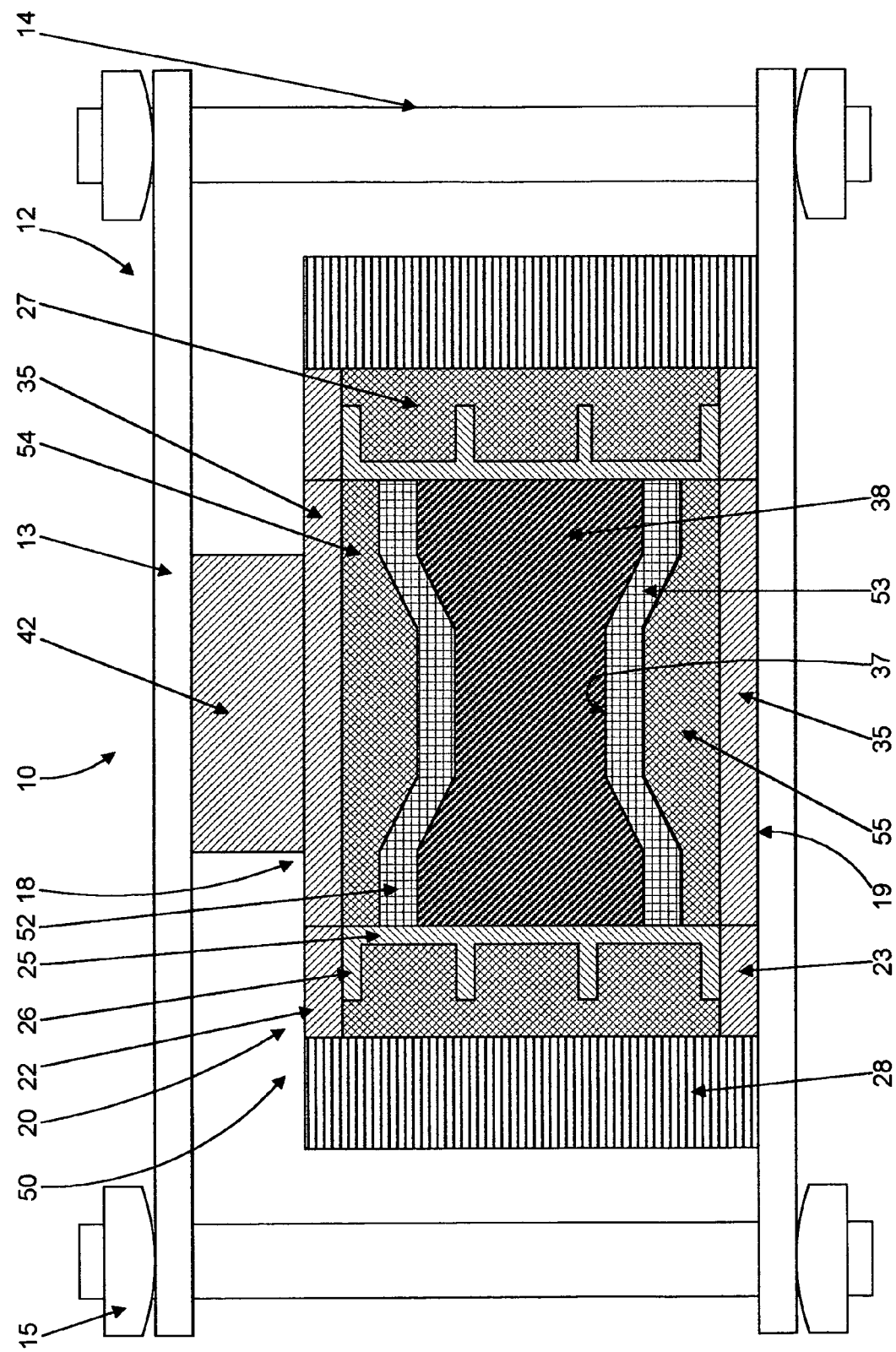
FIG. 5 is a cross-sectional view of a mold of the present invention including a sidewall with a cylindrical metal sleeve and two ceramic plungers coated with metal adjacent the mold cavity and adapted to mold work material into a workpiece of complex shape in a conventional microwave oven.

FIG. 5 provides a diagrammatic view of an alternative embodiment of the mold 50 of the present invention. The design of this mold is very similar to that shown in FIG. 2 with like elements numbered the same. A significant difference between mold 11 and mold 50 is that the upper and lower end mold members or plungers 18 and 19 include metal layers 52 and 53, respectively, adjacent to the mold cavity 37 and the work material 38 positioned therein. The presence of such metal layers protects the top and bottom mold members from chipping and wearing, which significantly increases the mold life. In mold 50, the metal sleeve 25 of sidewall 20 and metal layers 52 and 53 form a metal enclosure with inner surfaces defining the mold cavity 37 where the work material 38 is placed for processing. This metal enclosure is contiguously enclosed by a microwave absorbing ceramic enclosure formed by outer ceramic layers 27 of sidewall 20 and ceramic layers 33 and 34 of end mold members 18 and 19. As discussed above, this metal enclosure shields the work material 38 from exposure to the electric field and the work material 38 is heated only due to thermal conduction and radiation from mold members 20, 18 and 19, which, in turn, are heated by microwave energy. For mold 50, the conditions for uniform heating formulated in Formula (4) as the approximate equality of the heating rates of all of the mold members. The heating rates of the mold members in mold 50 are chosen in the same ways as for mold 11 and are around 60° F./min. To provide this condition, microwave absorbing ceramic layers 54 and 55 in mold 50 should be made of material different from that of layers 33 and 34 of mold 11. Quotient $M_{ceramic}/M_{total}$ is equal to one for the end mold members of mold 11, while for end mold members of the mold 50 the quotient $M_{ceramic}/M_{total}$ is less then one. For this reason, tan δ/∈cρ of microwave absorbing ceramic layers 54 and 55 should be grater then that of layers 33 and 34 respectively by the factor of $M_{total}/M_{ceramic}$ to compensate for this difference. Some such calculations are given hereafter in the Examples of experimental molds. The metal layers of the top and bottom mold members may cover the associated ceramic surface only partially and may have a complex shape for molding complex shape parts. This simplifies the mold making since machining of metal layers of complex shape is much easier and cheaper then machining or fabrication of ceramic parts of the same shape.

A typical temperature profile of the work material 38 inside the mold cavity 37 of mold 50 is shown in FIG. 4B.

By the end of heating cycle, the mold members 20,18 and 19 will be heated to the desired temperatures. The peripheral regions of the work material 38 will be heated significantly faster then its central region. To improve the temperature profile inside the volume of work material 38 and prevent overheating of the peripheral regions, the heating process is periodically interrupted to permit the accumulated heat in the microwave absorbing layers 27, 33 and 34 to transfer by conduction toward the center region of the work material 38 without overheating the peripheral region. The microwave generator is run in cycles of 3–5 minute on and then 2–3 minutes off until the temperature of the center of the work material 38 reaches the desired temperature. Although periodically interrupting the heating cycle increases the overall time required to heat the work material to the desired temperature, the overall heating time required will still be significantly less than heating by conventional means.

After the work material 38 in mold 50 is heated throughout to the desired temperature, the mold assembly 10 containing mold 11 or 50 is taken from the oven and placed into a hydraulic press, not shown. Under applied pressure, the upper end mold member 18 moves toward the bottom end mold member 19 compressing the molten work material 38 into the desired shape to form the workpiece 39 with the final compaction and consolidation. The nuts 15 are tightened to hold the shape of molded part during cooling cycle. As in the case of mold 11 discussed above, the uniform temperature field in mold 50 will be established inside the work material 38 due to the significantly greater mass of the mold 50 versus the mass of the work material 38.

Figure 6:
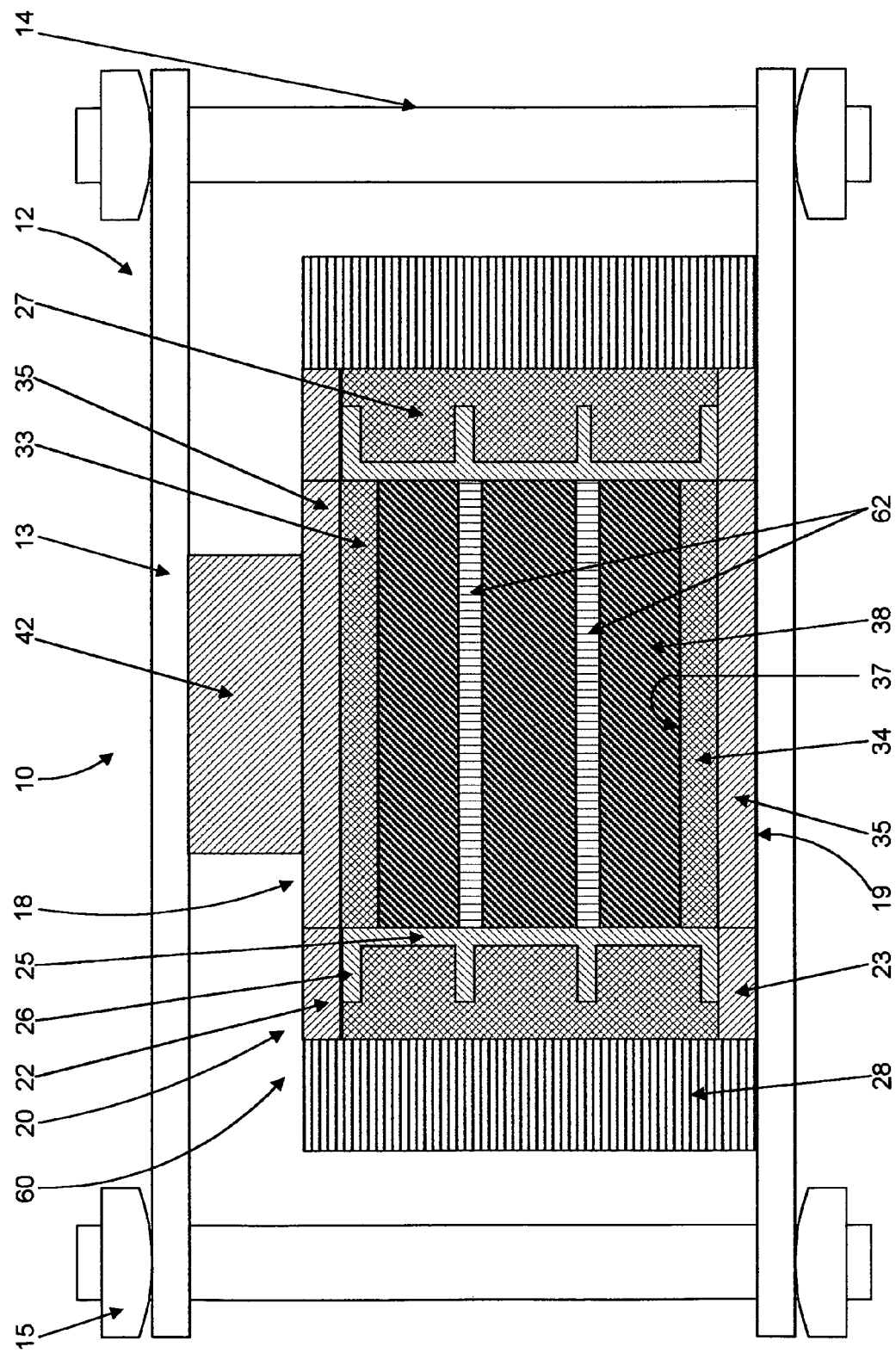
FIG. 6 is a cross-sectional view of a mold with a multi-layer mold structure containing separators for providing uniform heating of work material separated by the separators and reducing heating process time.

A second alternative embodiment of the mold is shown in FIG. 6 as mold 60, which is particularly well adapted for molding multiple layer structures for processing workpieces 39 of relatively thin, flat stock shapes such as plates, sheets, discs and the like. Mold 60 is similar in construction to mold 11, with corresponding parts similarly numbered, except that mold 60 includes separators or spacers 62 equally spaced or positioned between the end mold members or plungers 18 and 19. The space between the end mold members 18 and 19 and the separators 62 is filled with work material 38. The number of separators 62 is selected depending on the desired thickness of the part workpiece 39 to be formed. The separators 62 may be made of metal, alloys, or ceramic and should have high mechanical strength to withstand the pressure during compression and should have high thermal conductivity for efficient heat transfer from the peripheral region to the central region of the work material 38.

In one embodiment, separators 62 are made of microwave absorbing ceramic material. This allows more uniform heating of the layers of work material. Such separators may be made of SiC with necessary amounts of $Al_2O_3$ added to control heating rate of these separators.

The presence of such separators 62 in the mold cavity 37 significantly shortens the process cycle in comparison with that of solid workpieces 38 of greater thickness molded in the same cavity 37 without separators 62. It is also foreseen that although not shown, separators 62 could be used with a mold of the type shown in FIG. 5 as mold 50 having metal layers 52 and 53 formed on the inner surfaces of end mold members 18 and 19. It is also foreseen that the inner surfaces of the end mold members 18 and 19, the inner surfaces of the metal layers 52 and 53 and the surfaces of the separators 62 do not have to be planar, but could be shaped to produce a part with a selected shape.

Techniques for matching the parameters or properties of the mold and work material to obtain uniform heating are described in my Published U.S. Patent Application No. US 2003/0224082A1. The technique is oriented for processing high performance polymers and composites with high process temperatures and pressures. The molding temperature for such thermoplastics may exceed 400° C. and the applied pressures are usually around 2000 psi or more. Silicone carbide, SiC or the like is a preferred material for use as the base material for the ceramic parts of the mold members. SiC effectively absorbs microwave energy in a wide temperature range and can be heated easily and quickly from room temperature to well above 500° C. Aluminum Oxide, $Al_2O_3$ or the like may be used as an additive for mold materials of mold members due to its very low dissipation factor. The preferred technique is to modify the base mold material by adding additives in different quantities selected for each mold member individually.

The addition of additives like $Al_2O_3$, with a very low dissipation factor, into SiC will modify its dissipation factor depending on the volume fraction of additive and may be given by formula:

$$(\tan \delta)_{mixture} = (\tan \delta)_{SiC} \times \frac{1}{1 + V_{add}/V_{SiC}} \quad (5)$$

Here:
$(\tan \delta)_{mixture}$=dissipation factor of the mixture,
$(\tan \delta)_{SiC}$=dissipation factor of SiC and is approximately equal to 0.05,
$V_{add}/V_{SiC}$=volume fraction of the additive with low dissipation factor.

When designing molds, such as molds 11, 50 and 60 shown in FIG. 2, FIG. 5 and FIG. 6, SiC or the like may be used as the base mold material forming the microwave absorbing layers 27, 33 and 34. Aluminum Oxide, $Al_2O_3$ may be added to the microwave absorbing layers 27, 33 and 34 of each mold member in quantities selected to control the effective thermosensitivities of the mold members 20, 18 and 19 and modify them to equalize their heating rates. The effective thermosensitivities of mold members, as it is shown in formula (4), may be effectively controlled by choosing a proper thickness (or mass) of the microwave absorbing layers 27, 33 and 34. The value of the effective thermosensitivities of each mold member 20, 18 and 19 is estimated using the formula (4), taking into account the percentage of additives and the mass of each component of the mold members 20, 18 and 19. The mixture of SiC and $Al_2O_3$ powders are formed into the desired shape by conventional methods of ceramic processing. Using the above-described technique, the desired mold materials may be created for a wide range of thermal, mechanical and dielectric properties of polymers to be processed.

Experimental molds were designed for molding different thermoplastic materials in conventional microwave ovens 1 and the results are described in the following examples.

EXAMPLE 1

Mold for Parts 5" in Diameter

A mold of the type generally shown in FIG. 2 as mold 11 was created for molding a part having a diameter of 5 inches. The mold includes a metal cylinder or sleeve 25 with an inner diameter of 5 inches and a height of 4 inches. The outside diameter of each molded part or workpiece 39 formed by the mold is 5 inches, and the approximate height of the work piece 39, after compaction, is approximately 1.8 inches. The mass of the metal sleeve 25 is 3 kg and the mass of the ceramic microwave absorbing layer 27 extending around sleeve 25 is 1.8 kg. The mass of the microwave absorbing layers 33 and 34 of end mold members 18 and 19 are 1.1 kg each. From here, we can find that the quotient $M_{ceramic}/M_{total}$ for the sidewall member 20 is equal to 0.37 while for top and bottom plungers it is equal to 1. This should be taken in to account while using formula (4) for determining the quantity of the additives to be added to the base mold material of each mold member 20, 18 and 19. From formula (4) it can be seen that the parameter (tan $\delta/\in c\rho$) for the microwave absorbing layer 27 of sidewall 20 should be 2.7 times higher in comparison with that of the end mold members 18 and 19 and, hence, less $Al_2O_3$ must be added to the SiC of the layer 27 to satisfy equation (4).

The molding process was performed in a Panasonic microwave oven model NE-3280. This oven is powered by 4 magnetrons operating at the frequency 2450 MHz and with maximum available microwave power 3.2 kW. Molded parts 39 were made with mold 11 from the following high performance engineering thermoplastics:

KETRON® PEEK 1030
KETRON® PEEK 1331
KETRON® PEEK 1043
TORLON® 4275
TORLON® 4540
SEMITRON® ESd 420
SEMITRON® ESd 480
SEMITRON® ESd 410C
CELAZOLE® PBI

All of these materials may be characterized as having a high or moderate dissipation factor at an operating frequency 2450 MHz, except CELAZOLE® PBI, which has a low dissipation factor, and, thus, requires prolonged heating time. The heating schedule for all these materials was almost the same with small variations (except CELAZOLE® PBI) depending on process temperature of each particular material. As mentioned above, the heating process was intermittently interrupted to allow equalization of the temperature field inside the mold cavity 37. The average heating time was around 27 minutes while the total heating process time was around 50 minutes including the intervals when heating was interrupted. An examination of a cross-section of these parts reveals a high quality molded part without porosity or grain growth.

EXAMPLE 2

The same sidewall mold member 20 as in Example 1 was used with end mold members 18 and 19 including metal layers 52 and 53 to form a mold similar to mold 50 shown in FIG. 5. The mass of each metal layer 52 and 53 is 0.3 kg. The mass of each of the ceramic microwave absorbing layers 54 and 55 remained 1.1 kg each. The quotient $M_{ceramic}/M_{total}$ for the end mold members 18 and 19 is equal to 0.78. From formula (4) it is observed that ceramic microwave absorbing layer 54 and 55 require 1.3 times higher the value of parameter (tan $\delta/\in c\rho$) in comparison with that of layers 33 and 34 of Example 1 without metal layers 52 and 53. Hence, the metal clad end mold members 18 and 19 require the addition of less $Al_2O_3$ into the SiC base material to satisfy equation (4).

The molding process for this mold, of the type shown in FIG. 5 as mold 50, was performed in the same oven with approximately the same heating schedule as described in Example 1. Molded parts of diameter 5" and 1.8" thick were molded from conductive grade KETRON® PEEK1030 with a very high dissipation factor and from ULTEM®1000 with a very small dissipation factor (tan δ approximately equal to 0.001). The process temperature for KETRON® PEEK1030 was 730° F. and for ULTEM® 1000 it was 530° F. These materials were also used for molding multi-layer structures in a mold of the type shown in FIG. 6 as mold 60. The number of separators 62 varied from 1 to 4 permitting the molding of parts of different thicknesses and in different quantities, as shown in Table 1, in the same mold.

TABLE 1

| Number of separators | Thickness of parts | Quantity of parts |
|---|---|---|
| 0 | 1.8" | 1 |
| 1 | 3/4" | 2 |
| 2 | 1/2" | 3 |
| 3 | 3/8" | 4 |
| 4 | 1/4" | 5 |

All molded samples were of high quality without any sign of porosity or grain growth, demonstrating the usefulness of the disclosed molds for processing a variety of polymers with wide ranges of dielectric and thermal properties.

EXAMPLE 3

Mold for Square Parts 12.25"×12.25"

A mold of the type shown in FIG. 2 as mold 11 was formed with a square metal cylinder or sleeve 25 forming the inner surface of the sidewall mold member 20 and defining a square mold cavity 12.25 inches by 12.25 inches with a height of 5 inches. The resulting molded parts have a shape of square plates, 12.25 inches by 12.25 inches with a height after compaction and consolidation of approximately 2 inches. The first version of this mold, did not include metal layers on the end mold members 18 and 19. The mass of each end mold member 18 and 19 is 8.1 kg, the mass of metal sleeve 25 of sidewall mold member 20 is 21 kg, and the mass of the ceramic microwave absorbing layer 27 of sidewall 20 is 15 kg. The quantities of $Al_2O_3$ additives for each mold member were chosen individually using formula (4) as described above.

The molding process was performed in a batch microwave oven 1 operating at a frequency of 915 MHz. The dimensions of the chamber 2 of batch oven 1 were 4 feet by 4 feet by 4 feet. The oven 1 had one launch port with a mode stirrer. The chamber 2 was connected to the generator by a rectangular waveguide and included a turntable for axial symmetry of the heating pattern. The incident power was 7 kW and the reflected power was 0.35 kW, which is 5% of the incident power. Low reflection from the applicator indicated good impedance matching and power transfer from the generator. The work material utilized was a powdered SEMITRON® ESd 420. The final process temperature was 550° F. An intermittent heating schedule as described above for Example 1 was utilized a total heating time of 50 minutes and a total process time of 1.5 hours. The resulting molded articles were of high quality.

EXAMPLE 4

The same sidewall mold member of Example 3 was used for a mold of the type shown in FIG. 5 with end mold members 18 and 19 having metal layers 52 and 53 formed thereon. The mass of each metal layer was 3.6 kg and the mass of each ceramic, microwave absorbing layer 33 and 34 was 7.4 kg each. The quotient $M_{ceramic}/M_{total}$ for these end mold members 18 and 19 is 0.67 and the ceramic microwave absorbing layers 33 and 34 should have higher values for the parameter ($\tan \delta/\in c\rho$) by a factor of 1.5 (which equals 1/0.67). Thus, less $Al_2O_3$ additive should be added to the ceramic layers 33 and 34 in comparison to Example 3.

The molding process was performed in the same batch microwave oven 1, and at the same conditions as in Example 3. The work material utilized was powdered SEMITRON® ESd 420 having a high dissipation factor and powdered ULTEM® 1000 having a very low dissipation factor (~0.001). These parts were molded using two separators 62 providing 3 plates 12.25"×12.25" of thickness ⅝". The total heating time for both the SEMITRON® ESd 420 and ULTEM® 1000 work material was 60 minutes and total process time (including interruptions) was 1.8 hours, i.e. a little longer than in the previous Example 3. An examination of a cross section of these parts revealed high quality of mold products without signs of porosity or grain growth.

Some mechanical properties, such as ultimate tensile strength and tensile elongation at break, were measured for microwave-molded parts. Tests results show the same or higher strengths compared to that of the same grades of polymers molded by conventional means.

The examples of microwave molding discussed above demonstrate the utility of the method and apparatus disclosed in the present invention for the effective microwave molding of products of complex shapes made from a wide variety of high performance engineering polymers and composites.

It is to be understood that while certain forms of the present invention have been illustrated and described herein, it is not to be limited to the specific forms, arrangement of parts, combinations of ingredients or process steps described and shown.

What is claimed is:

1. An apparatus for heating a work material using microwave radiation in a resonance cavity of a microwave oven, the work material to be molded into a workpiece, said apparatus comprising a mold positionable in the resonance cavity of said microwave oven; said mold comprising first and second end mold members and a circumferential mold member surrounding a mold cavity; said first end mold member moveable toward said second end mold member within said circumferential mold member to compress the work material in said mold cavity; said circumferential mold member including a metal sleeve extending around said mold cavity and a layer of microwave absorbing material positioned on an outer surface of said metal sleeve; said first and second end mold members including a layer of microwave absorbing material; wherein an effective thermosensitivity of each of said layers of microwave absorbing material of said circumferential mold member, said first end mold member and said second end mold member are approximately equal, such that exposing said mold to microwave radiation in said microwave oven results in relatively equal heating rates of each of said mold members; wherein the effective thermosensitivity of the layer of microwave absorbing material of each mold member is equal to the dissipation factor of the microwave absorbing material divided by the product of its dielectric constant, density and specific heat and multiplied by the ratio of the mass of the respective layer microwave of absorbing material over the total mass of the respective mold member.

2. An apparatus for heating a work material using microwave radiation in a resonance cavity of a microwave oven, the work material to be molded into a workpiece, said apparatus comprising a mold positionable in the resonance cavity of said microwave oven; said mold comprising first and second end mold members and a circumferential mold member surrounding a mold cavity; said first end mold member moveable toward said second end mold member within said circumferential mold member to compress the work material in said mold cavity; said circumferential mold member including a metal sleeve extending around said mold cavity and a layer of microwave absorbing material positioned on an outer surface of said metal sleeve; said first and second opposed end mold members each including a metal layer extending across said mold cavity and a layer of microwave absorbing material positioned on an outer surface of said metal layer; wherein each of said layers of microwave absorbing material of said circumferential mold member, said first end mold member and said second end mold member have an approximately equal effective thermosensitivity such that exposing said mold to microwave radiation in said microwave oven results in relatively equal heating rates of each of said mold members; wherein the effective thermosensitivity of the layer of microwave absorbing material of each mold member is equal to the dissipation factor of the microwave absorbing material divided by the product of its dielectric constant, density and specific heat and multiplied by the ratio of the mass of the respective layer microwave absorbing material over the total mass of the respective mold member.

* * * * *